United States Patent
Yeh

(10) Patent No.: US 9,467,203 B2
(45) Date of Patent: Oct. 11, 2016

(54) NEAR FIELD COMMUNICATION EXTENDING METHOD AND EXTENSION APPARATUS

(71) Applicant: Acer Incorporated, New Taipei (TW)

(72) Inventor: Neng-Wen Yeh, New Taipei (TW)

(73) Assignee: Acer Incorporated, New Taipei (TW)

( * ) Notice: Subject to any disclaimer, the term of this patent is extended or adjusted under 35 U.S.C. 154(b) by 184 days.

(21) Appl. No.: 14/459,321

(22) Filed: Aug. 14, 2014

(65) Prior Publication Data

US 2015/0111494 A1    Apr. 23, 2015

(30) Foreign Application Priority Data

Oct. 22, 2013  (TW) .............................. 102138150 A

(51) Int. Cl.
*H04B 5/00*   (2006.01)

(52) U.S. Cl.
CPC .................................. *H04B 5/0031* (2013.01)

(58) Field of Classification Search
CPC .. G06F 9/541; G06K 17/0022; G06Q 10/00; G06Q 10/087; H04B 5/0031; H04L 67/303; H04L 67/327; H04W 72/04; H04W 76/023; H04W 88/04
See application file for complete search history.

(56) References Cited

U.S. PATENT DOCUMENTS 8,014,722 B2    9/2011  Abel et al.

FOREIGN PATENT DOCUMENTS

| CN | 101843124 | 9/2010 |
| CN | 102857266 | 1/2013 |

*Primary Examiner* — Sujatha Sharma
(74) *Attorney, Agent, or Firm* — Jianq Chyun IP Office

(57) ABSTRACT

A near field communication (NFC) extending method and an extension apparatus are provided. The method includes the following steps: controlling a first NFC unit to perform a matching operation with a second NFC unit of a host device through an NFC function to establish a first wireless connection between a second communication unit in the host device and a first communication unit of the extension apparatus based on a wireless communication protocol; determining whether a matching data has been received from an electronic device through the NFC function; if yes, determining whether the first wireless connection is valid; and if yes, transmitting the matching data to the host device through the first wireless connection.

6 Claims, 3 Drawing Sheets

NEAR FIELD COMMUNICATION EXTENDING METHOD AND EXTENSION APPARATUS

CROSS-REFERENCE TO RELATED APPLICATION

This application claims the priority benefit of Taiwan application serial no. 102138150, filed on Oct. 22, 2013. The entirety of the above-mentioned patent application is hereby incorporated by reference herein and made a part of this specification.

BACKGROUND OF THE INVENTION

1. Field of the Invention

The invention relates to an extending method and an extension apparatus, and more particularly, to a near field communication extending method and an extension apparatus.

2. Description of Related Art

Due to high reliability, security and convenience, application of near field communication (NFC) becomes more and more widespread. As long as devices are close enough to each other, functions such as making a payment, identifying an identity and so on are easily achievable. In addition to functions like authentication for financial purposes, common NFC functions also include matching authentication between devices, such as Bluetooth, wireless fidelity direct (Wi-Fi direct) and so on.

However, in regard to some devices, although their NFC function makes it easy to perform authentication with other devices, such authentication is usually a one-time behavior, which leads to quite low frequency of use of the NFC function. Take a matching behavior between a Bluetooth mouse and a computer for instance. After the Bluetooth mouse performs matching with the computer through its NFC function, there is almost no chance for the NFC function to be used again. From another point of view, although a designer increases the cost of the Bluetooth mouse for installing an NFC chip, due to an extremely low frequency of use of the chip, a waste of cost is unconsciously caused.

SUMMARY OF THE INVENTION

In view of the above, the invention provides a near field communication (NFC) extending method and an extension apparatus that effectively increase the frequency of use of an NFC function in the extension apparatus.

The invention provides an NFC extending method that is adapted to an extension apparatus including a first NFC unit and a first communication unit. The method includes the following steps. The first NFC unit is controlled to perform a matching operation with a second NFC unit of a host device through an NFC function, so as to establish a first wireless connection between a second communication unit in the host device and the first communication unit of the extension apparatus based on a wireless communication protocol. Next, whether a matching data has been received from an electronic device through the NFC function is determined. If yes, whether the first wireless connection is valid is determined. If yes, the matching data is transmitted to the host device through the first wireless connection.

The invention provides an extension apparatus including a first NFC unit, a first communication unit, a memory unit and a processing unit. The memory unit stores a plurality of program codes. The processing unit is coupled to the first NFC unit, the first communication unit and the memory unit. The processing unit is configured for accessing the program codes to execute the following steps. First, the processing unit controls the first NFC unit to perform a matching operation with a second NFC unit of a host device through an NFC function, so as to establish a first wireless connection between a second communication unit in the host device and the first communication unit of the extension apparatus based on a wireless communication protocol. Next, the processing unit determines whether the first NFC unit has received a matching data from an electronic device through the NFC function. If yes, the processing unit determines whether the first wireless connection is valid. If yes, the processing unit controls the first communication unit to transmit the matching data to the host device through the first wireless connection.

Based on the above, the extension apparatus and the NFC extending method thereof proposed by the embodiments of the invention make it possible to establish the first wireless connection (e.g. Bluetooth connection) with the host device through the matching operation, followed by establishing a connection between the first NFC unit and the electronic device, so as to obtain from the electronic device the matching data that enables the host device to perform matching with the electronic device.

In order to make the aforementioned and other features and advantages of the invention comprehensible, several exemplary embodiments accompanied with figures are described in detail below.

DETAILED DESCRIPTION OF DISCLOSED EMBODIMENTS

Figure 1:
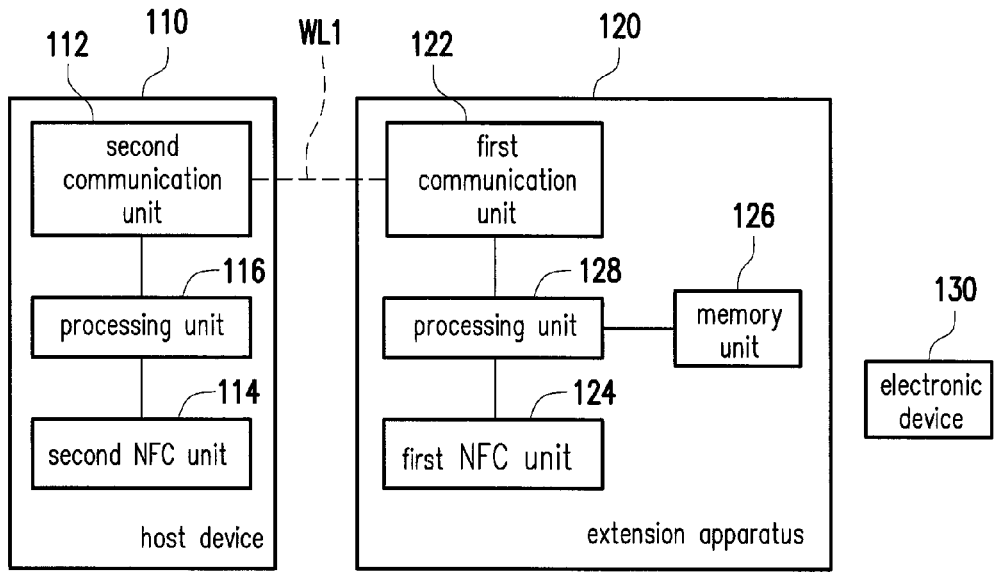
FIG. 1 is a schematic diagram of a near field communication (NFC) system according to an embodiment of the invention.

FIG. 1 is a schematic diagram of a near field communication (NFC) system according to an embodiment of the invention. In the present embodiment, an NFC system 100 includes a host device 110, an extension apparatus 120 and an electronic device 130. The host device 110, the extension apparatus 120 and the electronic device 130 are respectively, devices such as smart phone, tablet, notebook, personal computer or personal digital assistant (PDA).

The host device 110 includes a second communication unit 112, a second NFC unit 114 and a processing unit 116. The extension apparatus 120 includes a first communication unit 122, a first NFC unit 124, a memory unit 126 and a processing unit 128.

In the present embodiment, the first communication unit 122 and the second communication unit 112 are, for example, communication elements that communicate with each other based on the Wi-Fi direct protocol, the Bluetooth protocol or other similar communication protocols. The first NFC unit 124 and the second NFC unit 114 are respectively, for example, communication elements that perform data exchange with each other through an NFC function.

The processing unit 116 is coupled to the second communication unit 112 and the second NFC unit 114. The processing unit 128 is coupled to the first communication unit 122, the first NFC unit 124, and the memory unit 126. The processing units 116 and 128 are respectively, for example, general purpose processors, special purpose processors, conventional processors, digital signal processors, microprocessors, one or more microprocessors in association with a digital signal processor core, controllers, microcontrollers, application specific integrated circuits (ASICs), field programmable gate array (FPGA) circuits, any other types of integrated circuits, state machines, Advanced RISC Machine (ARM)-based processors, and the like. The memory unit 126 is, for example, a storage medium such as a hard disk, a solid state disk (SSD) or a memory. The memory unit 126 stores a plurality of program codes. The processing unit 128 executes the NFC extending method proposed by the embodiments of the invention by accessing these program codes. The details thereof will be described later.

In addition, the electronic device 130 also includes an NFC unit having the NFC function and a communication unit performing functions such as Wi-Fi communication and Bluetooth communication with the second communication unit 112 of the host device 110.

In brief, the extension apparatus 120 proposed by the embodiments of the invention establishes a wireless connection (e.g. Bluetooth connection) with the host device 110 through a matching operation, followed by establishing a connection between the first NFC unit 124 thereof and the electronic device 130, so as to obtain from the electronic device 130 a matching data (e.g. identity information of the electronic device 130, etc.) that enables the host device 110 to perform matching with the electronic device 130. Next, the extension apparatus 120 transmits the matching data to the host device 110 through the wireless connection (e.g. Bluetooth connection) previously established with the host device 110. In other words, the extension apparatus 120 may replace the host device 110 in performing the NFC function with the electronic device 130, so that the host device 110 performs matching with the electronic device 130 according to the matching data (e.g. identity information of the electronic device 130) transmitted by the extension apparatus 120. Details of the above are described with reference to FIG. 2A and FIG. 2B and relevant descriptions in the following.

Figure 2A:
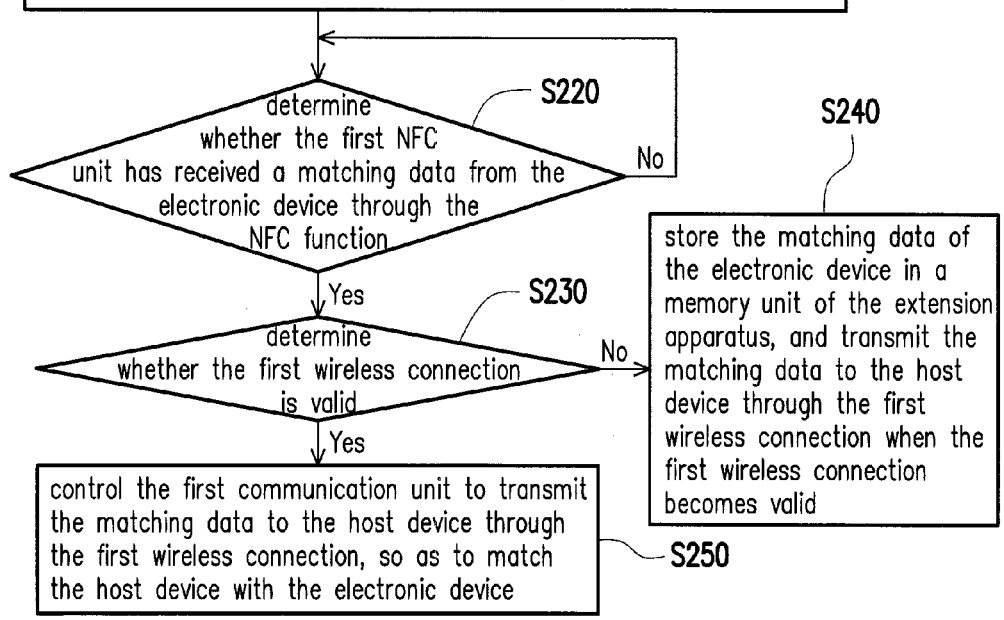
FIG. 2A is a flowchart of an NFC extending method according to an embodiment of the invention.

FIG. 2A is a flowchart of an NFC extending method according to an embodiment of the invention. The method shown in FIG. 2A is executable by the extension apparatus 120 in FIG. 1. Steps of the method in the present embodiment are described hereinafter with reference to devices and units in FIG. 1.

In step S210, the processing unit 128 of the extension apparatus 120 controls the first NFC unit 124 to perform a matching operation with the second NFC unit 114 of the host device 110 through an NFC function, so as to establish a first wireless connection WL1 between the second communication unit 112 in the host device 110 and the first communication unit 122 of the extension apparatus 120 based on a wireless communication protocol.

Specifically, when the extension apparatus 120 is moved to be near the host device 110 by a user, so that a distance between the first NFC unit 124 and the second NFC unit 114 is shorter than a distance (e.g. 20 cm) that enables activation of the NFC function, the NFC functions of each of the first NFC unit 124 of the extension apparatus 120 and the second NFC unit 114 of the host device 110 could be (automatically) activated, so as to perform a data exchange operation (e.g. exchange of identity information) for establishing the first wireless connection WL1 (e.g. Bluetooth connection). Next, the processing unit 128 of the extension apparatus 120 and the processing unit 116 of the host device 110 respectively set the first communication unit 122 and the second communication unit 112 correspondingly to the aforementioned exchanged data, so that the host device 110 and the extension apparatus 120 perform various subsequent file transmission operations (e.g. transmission of files) through the first wireless connection WL1 (e.g. Bluetooth connection).

In other words, for the user, by simply placing the extension apparatus 120 near the host device 110, it is possible to make the extension apparatus 120 automatically perform matching with the host device 110 to establish the first wireless connection WL1 such as a Bluetooth connection.

In the present embodiment, after the first wireless connection WL1 is established between the host device 110 and the extension apparatus 120, the user may trigger the NFC function of each of the extension apparatus 120 and the electronic device 130 by placing the extension apparatus 120 near the electronic device 130.

Therefore, in step S220, the processing unit 128 determines whether the first NFC unit 124 has received the matching data from the electronic device 130 through the NFC function. If not, the processing unit 128 repeats step S220. On the other hand, if the processing unit 128 determines that the first NFC unit 124 has received the matching data from the electronic device 130, the processing unit 128 executes step S230 to further determine whether the first wireless connection WL1 is valid.

In detail, since the first wireless connection WL1 may become invalid due to factors such as a distance between the host device 110 and the extension apparatus 120, communication environment and so on, when the extension apparatus 120 has received the matching data, it does not immediately transmit the matching data to the host device 110, but first determines whether the first wireless connection WL1 is still valid. In addition, when the user turns off either the first communication unit 122 or the second communication unit 112, it may cause the first wireless connection WL1 to become invalid. Hence, the processing unit 128 avoids invalid data transmission by step S230.

When the processing unit 128 determines that the first wireless connection WL1 is invalid, the processing unit 128 executes step S240 to store the matching data of the electronic device 130 in the memory unit 126 of the extension apparatus 120, and to transmit the matching data to the host device 110 through the first wireless connection WL1 when the first wireless connection WL1 becomes valid. In other words, before the first wireless connection WL1 returns to a valid state, the processing unit 128 temporarily stores the matching data in the memory unit 126 thereof.

On the other hand, when the processing unit 128 determines that the first wireless connection WL1 is valid, the processing unit 128 executes step S250 to control the first communication unit 122 to transmit the matching data to the host device 110 through the first wireless connection WL1, so as to match the host device 110 with the electronic device 130. It is worth noting that the first communication unit 122 of the extension apparatus 120 not only transmits the matching data through the first wireless connection WL1 but also transmits software profile associated with the extension apparatus 120. For instance, when the host device 110 is a computer and the extension apparatus 120 is a mouse, the extension apparatus 120 not only transmits the matching data through the first wireless connection WL1, but also, when the user moves the mouse, correspondingly transmits its movement information to the computer, so that the computer reflects the user's behavior and performs operations such as moving a cursor.

In this way, even when the host device 110 and the electronic device 130 have lower mobility, it is possible for the user to use the extension apparatus 120 as a medium for matching the host device 110 with the electronic device 130. For instance, when the host device 110 is a personal computer and the electronic device 130 is a notebook, by simply matching the extension apparatus 120 with the host device 110, the user may then use the extension apparatus 120 (e.g. wireless mouse) that is easier to move as a substitute for the host device 110 to perform matching with the electronic device 130.

In addition, when the extension apparatus 120 is an apparatus that does not often use its NFC function, the method proposed by the embodiments of the invention also increases the frequency of use of the NFC function and the first communication unit 122 of the extension apparatus 120. For instance, when the extension apparatus 120 is a mouse, after it performs matching with the host device 110 (e.g. computer), its NFC function may no longer be used. However, through the method proposed by the embodiments of the invention, the NFC function of the extension apparatus 120 may be applied for other purposes, instead of being installed only for the purpose of matching with the host device 110.

In addition, in other embodiments, a designer may further install a matching switch on the extension apparatus 120. Accordingly, in cases where the first wireless connection WL1 is invalid, the extension apparatus 120 determines whether to perform matching with another device (e.g. electronic device 130) depending on an ON or OFF state of the matching switch. In the present embodiment, when the user switches the matching switch to the ON state, it means that the user allows the extension apparatus 120 to perform matching with another device. When the user switches the matching switch to the OFF state, it means that even if the first wireless connection WL1 is invalid, the extension apparatus 120 is not allowed to perform matching with another device. The details are provided as follows.

Figure 2B:
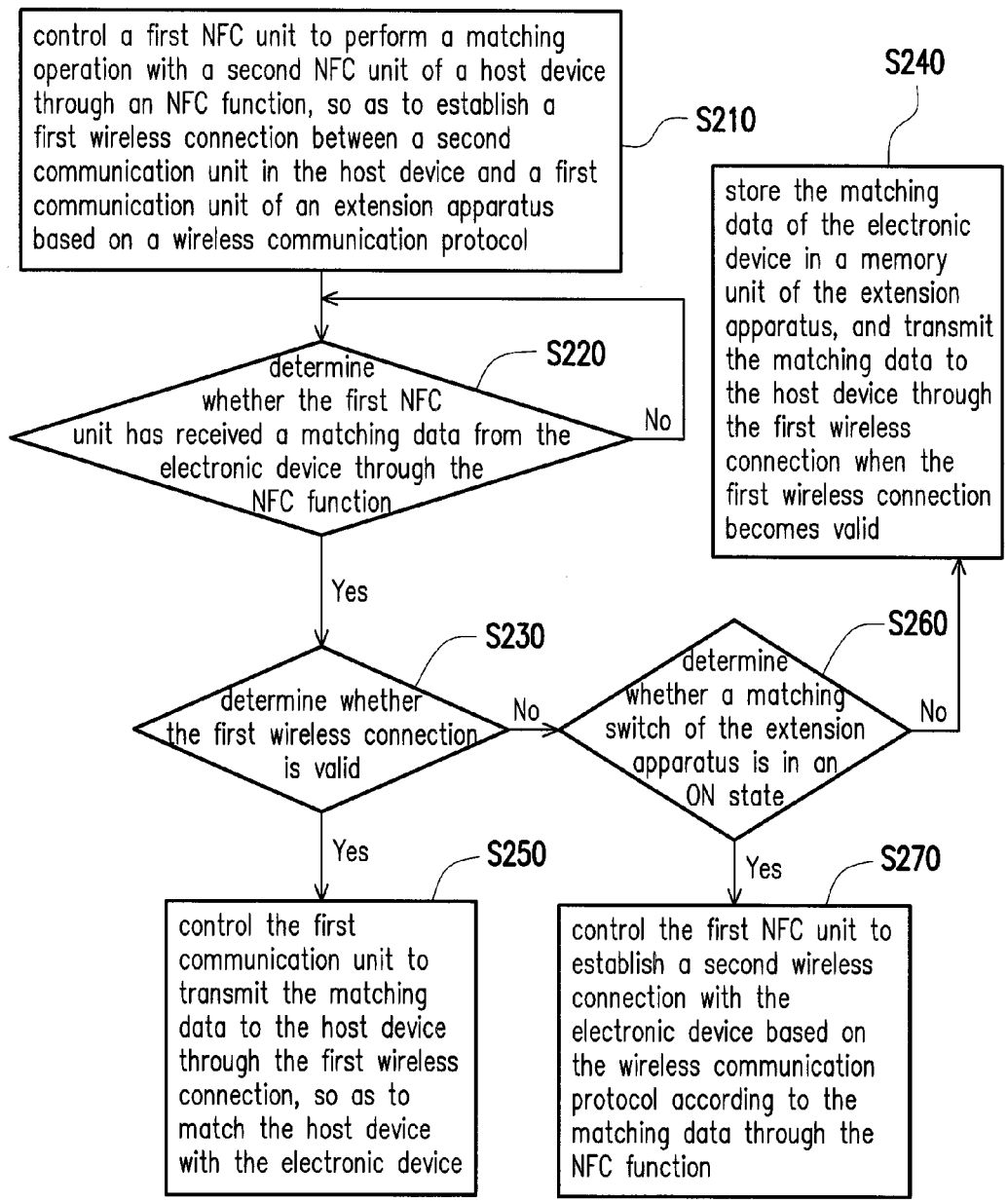
FIG. 2B is a flowchart of an NFC extending method according to an embodiment of the invention.

FIG. 2B is a flowchart of an NFC extending method according to an embodiment of the invention. The method shown in FIG. 2B is executable by the extension apparatus 120 in FIG. 1. Steps of the method in the present embodiment are described hereinafter with reference to devices and units in FIG. 1. In the present embodiment, details of steps S210 to S250 have been described in the relevant descriptions of the embodiment of FIG. 2A, and thus are not repeated herein.

A difference from FIG. 2A lies in that when the processing unit 128 determines that the wireless connection is invalid, the processing unit 128 continues to execute step S260 to determine whether the matching switch of the extension apparatus 120 is in the ON state. If not, the processing unit 128 executes step S240 similar to that in FIG. 2A.

However, when the processing unit 128 determines that the matching switch is in the ON state, the processing unit 128 executes step S270 to control the first NFC unit 124 to establish a second wireless connection (e.g. Bluetooth connection) with the electronic device 130 based on the wireless communication protocol according to the matching data through the NFC function. In other words, in cases where the first wireless connection WL1 is invalid and the matching switch is in the ON state, when the user moves the extension apparatus 120 to be within the distance (e.g. 20 cm) sufficient for activation of the NFC function with the electronic device 130, the extension apparatus 120 automatically performs the aforementioned matching operation with the electronic device 130. That is to say, at this moment, the extension apparatus 120 no longer serves as the medium for matching the host device 110 with the electronic device 130, but directly performs matching with the electronic device 130 to establish the second wireless connection (e.g. Bluetooth connection).

Although it has been disclosed in previous embodiments that the extension apparatus 120 transmits the matching data and its software profile (e.g. the movement information of the mouse) through the first wireless connection WL1, in other embodiments, the host device 110 and the extension apparatus 120 may be additionally equipped with other communication units for establishing other connections between the host device 110 and the extension apparatus 120, so as to separate transmission paths of the matching data and the software profile.

Figure 3A:
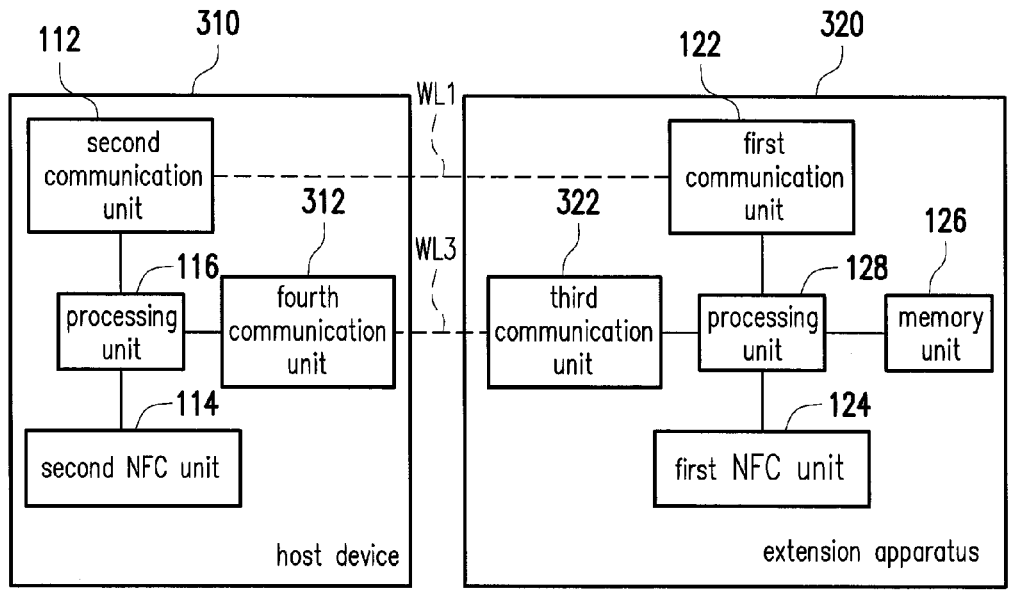
FIG. 3A is a schematic diagram of a host device and an extension apparatus according to an embodiment of the invention.

FIG. 3A is a schematic diagram of a host device and an extension apparatus according to an embodiment of the invention. In the present embodiment, an extension apparatus 320 includes, in addition to all the elements of the extension apparatus 120 in FIG. 1, a third communication unit 322 connected to the processing unit 128. Similarly, a host device 310 includes, in addition to all the elements of the host device 110 in FIG. 1, a fourth communication unit 312 connected to the processing unit 116.

Similarly to the content disclosed in previous embodiments, the first NFC unit 124 performs matching with the second NFC unit 114 to establish the first wireless connection WL1 between the first communication unit 122 and the second communication unit 112. At the same time, the third communication unit 322 and the fourth communication unit 312 may also establish a third wireless connection WL3 by the matching operation performed between the first NFC unit 124 and the second NFC unit 114. In this way, the matching data and the software profile are transmitted between the host device 310 and the extension apparatus 320 respectively through the first wireless connection WL1 and the third wireless connection WL3, thereby separating the transmission paths of these two kinds of data.

Figure 3B:
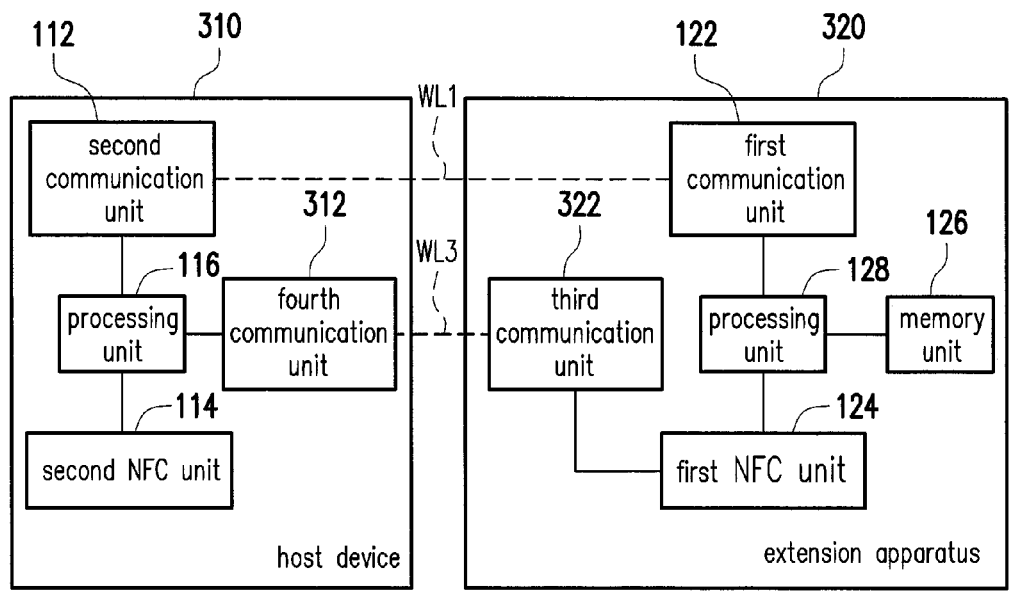
FIG. 3B is a schematic diagram of a host device and an extension apparatus according to an embodiment of the invention.

FIG. 3B is a schematic diagram of a host device and an extension apparatus according to an embodiment of the invention. A difference from FIG. 3A lies in that the third communication unit 322 in the present embodiment is not connected to the processing unit 128, but to the first NFC unit 124. In the present embodiment, the matching data and the software profile may still be transmitted between the host device 310 and the extension apparatus 320 respectively through the first wireless connection WL1 and the third wireless connection WL3, thereby separating the transmission paths of these two kinds of data.

In summary, the extension apparatus and the NFC extending method thereof proposed by the embodiments of the invention make it possible to establish the first wireless connection (e.g. Bluetooth connection) with the host device through the matching operation, followed by establishing a connection between the first NFC unit and the electronic device, so as to obtain from the electronic device the matching data that enables the host device to perform matching with the electronic device. Next, the extension apparatus transmits the matching data to the host device through the first wireless connection previously established with the host device. In other words, the extension apparatus may replace the host device in performing the NFC function with the electronic device, so that the host device performs matching with the electronic device according to the matching data transmitted by the extension apparatus. In this way, even when the host device and the electronic device have lower mobility, it is possible for the user to use the extension apparatus as the medium for matching the host device with the electronic device.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A near field communication (NFC) extending method, adapted to an extension apparatus comprising a first NFC unit and a first communication unit, the method comprising:
    controlling the first NFC unit to perform a matching operation with a second NFC unit of a host device through an NFC function to establish a first wireless connection between a second communication unit in the host device and the first communication unit of the extension apparatus based on a wireless communication protocol;
    determining whether a matching data has been received from an electronic device through the NFC function;
    if yes, determining whether the first wireless connection is valid;
        when the first wireless connection is valid, controlling the first communication unit to transmit the matching data to the host device through the first wireless connection, and
        when the first wireless connection is invalid, storing the matching data of the electronic device in a memory unit of the extension apparatus, and when the first wireless connection becomes valid, controlling the first communication unit to transmit the matching data to the host device through the first wireless connection.

2. The method according to claim 1, wherein after the step of determining whether the first wireless connection is valid, further comprising:
    when the first wireless connection is invalid, determining whether a matching switch of the extension apparatus is in an ON state;
        if yes, controlling the first NFC unit to establish a second wireless connection with the electronic device based on the wireless communication protocol according to the matching data through the NFC function.

3. The method according to claim 2, wherein after the step of determining whether the matching switch of the extension apparatus is in the ON state, further comprising:
    when the matching switch is not in the ON state, storing the matching data of the electronic device in a memory unit of the extension apparatus, and when the first wireless connection becomes valid, controlling the first communication unit to transmit the matching data to the host device through the first wireless connection.

4. An extension apparatus, comprising:
    a first near field communication (NFC) unit;
    a first communication unit;
    a memory unit storing a plurality of program codes; and
    a processing unit coupled to the first NFC unit, the first communication unit and the memory unit, and configured for accessing the program codes to execute the following steps:
        controlling the first NFC unit to perform a matching operation with a second NFC unit of a host device through an NFC function to establish a first wireless connection between a second communication unit in the host device and the first communication unit of the extension apparatus based on a wireless communication protocol;
        determining whether the first NFC unit has received a matching data from an electronic device through the NFC function;
        if yes, determining whether the first wireless connection is valid;
            when the first wireless connection is valid, controlling the first communication unit to transmit the matching data to the host device through the first wireless connection, and
            when the first wireless connection is invalid, storing the matching data of the electronic device in a memory unit of the extension apparatus, and when the first wireless connection becomes valid, controlling the first communication unit to transmit the matching data to the host device through the first wireless connection.

5. The extension apparatus according to claim 4, wherein when the first wireless connection is invalid, the processing unit is further configured to determine whether a matching switch of the extension apparatus is in an ON state;
    if yes, the process unit controls the first NFC unit to establish a second wireless connection with the electronic device based on the wireless communication protocol according to the matching data through the NFC function.

6. The extension apparatus according to claim 5, wherein when the matching switch is not in the ON state, the process unit further stores the matching data of the electronic device in the memory unit of the extension apparatus, and when the first wireless connection becomes valid, the process unit controls the first communication unit to transmit the matching data to the host device through the first wireless connection.

* * * * *